US011306979B2

United States Patent
Yun et al.

(10) Patent No.: US 11,306,979 B2
(45) Date of Patent: Apr. 19, 2022

(54) HEAT EXCHANGER RIBLET AND TURBULATOR FEATURES FOR IMPROVED MANUFACTURABILITY AND PERFORMANCE

(71) Applicant: Hamilton Sundstrand Corporation, Windsor Locks, CT (US)

(72) Inventors: Thomas M. Yun, Glastonbury, CT (US); Vijay Narayan Jagdale, South Windsor, CT (US); Jin Lee, Glastonbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 90 days.

(21) Appl. No.: 16/210,932

(22) Filed: Dec. 5, 2018

(65) Prior Publication Data
US 2020/0182559 A1    Jun. 11, 2020

(51) Int. Cl.
*F28F 1/02*     (2006.01)
*B29C 64/153*    (2017.01)
(Continued)

(52) U.S. Cl.
CPC .............. *F28F 1/022* (2013.01); *B22F 5/10* (2013.01); *B29C 64/153* (2017.08); *F28F 1/045* (2013.01);
(Continued)

(58) Field of Classification Search
CPC .... F28D 1/0246; F28D 1/0233; F28D 7/0008; F28D 7/0025; F28D 7/0041;
(Continued)

(56) References Cited

U.S. PATENT DOCUMENTS 1,076,364 A * 10/1913 Harrison .................. F28F 3/04
165/153
1,559,213 A * 10/1925 Winterbottom ....... F28D 1/0246
165/54
(Continued)

FOREIGN PATENT DOCUMENTS

EP      2871435 A1    5/2015
EP      3296678 A1    3/2018
(Continued)

OTHER PUBLICATIONS

Extended European Search Report dated Apr. 28, 2020, received for corresponding European Application No. 19213758.6, 9 pages.

*Primary Examiner* — Paul Alvare
*Assistant Examiner* — Jose O Class-Quinones
(74) *Attorney, Agent, or Firm* — Kinney & Lange, P.A.

(57) ABSTRACT

An additively-manufactured heat exchanger includes fluidly-separated alternating first and second layers having respective flow channels which can include one or more features that is either a riblet or a turbulator. A riblet includes a riblet peak and/or a riblet valley, which has a riblet slope, and the riblet peak and/or riblet valley has a riblet axis that is generally parallel to either the first fluid flow direction or the second fluid flow direction. A turbulator includes a turbulator peak and/or a turbulator valley, which has a turbulator slope, and the turbulator peak and/or turbulator valley has a turbulator axis that is generally perpendicular to either the first fluid flow direction or the second fluid flow direction. The respective slope angles are generally 25-65 deg. relative to build-axis, thereby resulting in improved surface roughness and uniformity control during the build process.

16 Claims, 7 Drawing Sheets

(51) Int. Cl.
| | |
|---|---|
| *B22F 5/10* | (2006.01) |
| *F28F 1/04* | (2006.01) |
| *F28F 1/08* | (2006.01) |
| *F28F 1/42* | (2006.01) |
| *F28F 13/12* | (2006.01) |
| *B33Y 10/00* | (2015.01) |
| *B33Y 80/00* | (2015.01) |
| *B29L 31/18* | (2006.01) |

(52) U.S. Cl.
CPC ............... *F28F 1/08* (2013.01); *F28F 1/422* (2013.01); *F28F 13/12* (2013.01); *B29L 2031/18* (2013.01); *B33Y 10/00* (2014.12); *B33Y 80/00* (2014.12); *F28F 2001/428* (2013.01); *F28F 2210/10* (2013.01); *F28F 2215/00* (2013.01); *F28F 2255/18* (2013.01)

(58) Field of Classification Search
CPC .... F28D 9/0025; F28D 9/0062; F28D 9/0068; F28D 9/0075; F28D 9/02; F28D 2021/0021; F28F 7/02; F28F 1/02; F28F 1/022; F28F 1/025; F28F 1/04; F28F 1/045; F28F 1/40; F28F 1/42; F28F 1/422; F28F 1/426; F28F 1/16; F28F 1/26; F28F 3/02; F28F 3/04; F28F 3/042; F28F 3/044; F28F 3/046; F28F 3/048; F28F 3/08; F28F 3/086; F28F 13/02; F28F 13/12; F28F 2250/02; F28F 2250/102; F28F 2250/104; F28F 2250/106; F28F 2250/108
See application file for complete search history.

(56) References Cited

U.S. PATENT DOCUMENTS

| | | | | | |
|---|---|---|---|---|---|
| 1,662,870 | A | * | 3/1928 | Stancliffe | F28D 9/0037 165/166 |
| 2,194,733 | A | * | 3/1940 | Andersen | F24H 3/105 165/166 |
| 2,288,061 | A | * | 6/1942 | Arnold | F28F 3/046 165/166 |
| 2,303,157 | A | * | 11/1942 | Bush | F24H 3/105 165/74 |
| 2,780,357 | A | * | 2/1957 | Robinson | G05D 9/00 210/101 |
| 3,525,391 | A | * | 8/1970 | Day | F28F 13/12 165/166 |
| 3,578,264 | A | * | 5/1971 | Kuethe | F28F 1/32 244/200.1 |
| 4,131,159 | A | * | 12/1978 | Long | F28D 9/0025 165/166 |
| 4,182,411 | A | * | 1/1980 | Sumitomo | F28F 3/046 165/110 |
| 4,183,403 | A | * | 1/1980 | Nicholson | F28D 9/0068 165/166 |
| 4,347,896 | A | * | 9/1982 | Rosman | F28D 9/0018 165/166 |
| 4,546,817 | A | * | 10/1985 | Wieland | F28D 19/045 165/10 |
| 4,715,431 | A | * | 12/1987 | Schwarz | F28D 9/0081 165/110 |
| 4,729,428 | A | * | 3/1988 | Yasutake | F28D 9/0062 165/153 |
| 4,749,032 | A | * | 6/1988 | Rosman | F28D 9/0018 165/167 |
| 5,016,707 | A | * | 5/1991 | Nguyen | F28F 3/086 165/165 |
| 5,040,596 | A | * | 8/1991 | Terasaki | F28D 9/0062 165/166 |
| 5,476,141 | A | * | 12/1995 | Tanaka | F28D 1/05391 165/173 |
| 5,725,051 | A | * | 3/1998 | Veltkamp | F28F 21/06 165/164 |
| 5,826,646 | A | * | 10/1998 | Bae | F28D 1/0308 165/110 |
| 6,047,769 | A | * | 4/2000 | Shimoya | F28D 1/0333 165/148 |
| 6,220,497 | B1 | * | 4/2001 | Benz | B01J 19/0093 228/118 |
| 6,345,791 | B1 | * | 2/2002 | McClure | B63B 1/34 244/200 |
| 6,935,418 | B1 | * | 8/2005 | Valaszkai | F28F 1/022 165/109.1 |
| 7,009,146 | B2 | * | 3/2006 | Torigoe | F28D 1/0246 219/202 |
| 7,871,578 | B2 | * | 1/2011 | Schmidt | B01J 19/0093 422/198 |
| 8,192,832 | B1 | * | 6/2012 | Lang | F28D 17/02 428/167 |
| 9,676,672 | B2 | * | 6/2017 | Lang | C04B 38/0019 |
| 9,835,387 | B2 | * | 12/2017 | Berta | F28F 1/10 |
| 2001/0032477 | A1 | * | 10/2001 | Schlom | F28F 3/025 62/310 |
| 2003/0164233 | A1 | * | 9/2003 | Wu | F28F 3/027 165/166 |
| 2003/0173720 | A1 | * | 9/2003 | Musso | C04B 35/00 264/635 |
| 2004/0069472 | A1 | * | 4/2004 | Shimoya | F28F 1/126 165/165 |
| 2004/0261379 | A1 | * | 12/2004 | Bruun | F23C 13/00 55/418 |
| 2005/0189099 | A1 | * | 9/2005 | Hanin | F28F 1/10 165/181 |
| 2006/0090887 | A1 | * | 5/2006 | Kato | F28F 3/048 165/166 |
| 2006/0157102 | A1 | * | 7/2006 | Nakajima | F01N 5/025 136/205 |
| 2006/0289152 | A1 | * | 12/2006 | Leuschner | F28F 1/126 165/152 |
| 2007/0053809 | A1 | * | 3/2007 | Brenner | B01F 5/061 422/225 |
| 2007/0056721 | A1 | * | 3/2007 | Usui | F28F 1/40 165/183 |
| 2009/0071638 | A1 | * | 3/2009 | Murayama | F28F 3/025 165/166 |
| 2009/0087604 | A1 | * | 4/2009 | Stewart | F28F 1/04 428/35.8 |
| 2009/0178426 | A1 | * | 7/2009 | Bhatti | F28D 5/02 62/304 |
| 2011/0000657 | A1 | * | 1/2011 | Ruckwied | F28F 1/42 165/181 |
| 2011/0132591 | A1 | * | 6/2011 | Morino | F28F 3/12 165/185 |
| 2012/0037346 | A1 | * | 2/2012 | Kim | F28F 1/42 165/149 |
| 2012/0199335 | A1 | * | 8/2012 | Maurer | F28D 9/0018 165/185 |
| 2013/0153184 | A1 | * | 6/2013 | Rolt | F28D 9/0037 165/166 |
| 2013/0168042 | A1 | * | 7/2013 | Garlapati | F28D 9/0031 165/51 |
| 2014/0008047 | A1 | | 1/2014 | Ito et al. | |
| 2014/0144611 | A1 | * | 5/2014 | Yoshimura | F28F 7/02 165/168 |
| 2014/0238006 | A1 | * | 8/2014 | Iwasaki | F02M 26/32 60/320 |
| 2015/0053380 | A1 | * | 2/2015 | Army, Jr. | B23H 1/00 165/166 |
| 2015/0053381 | A1 | | 2/2015 | Takada et al. | |
| 2015/0075758 | A1 | * | 3/2015 | Ishimaru | F28F 9/00 165/167 |
| 2015/0137412 | A1 | * | 5/2015 | Schalansky | B33Y 10/00 264/129 |
| 2016/0230595 | A1 | * | 8/2016 | Wong | F01D 25/12 |
| 2016/0305720 | A1 | * | 10/2016 | Rhee | F28F 1/126 |
| 2017/0044983 | A1 | * | 2/2017 | Duesler | F04D 29/5826 |
| 2017/0089643 | A1 | * | 3/2017 | Arafat | F28D 9/0093 |

(56) References Cited

U.S. PATENT DOCUMENTS

| | | | |
|---|---|---|---|
| 2017/0144255 A1* | 5/2017 | Song | B64C 21/10 |
| 2017/0146305 A1* | 5/2017 | Kuczek | F28F 9/0256 |
| 2017/0157722 A1* | 6/2017 | Ranjan | F28F 13/18 |
| 2017/0198978 A1* | 7/2017 | Kuczek | F28D 7/0066 |
| 2017/0198979 A1* | 7/2017 | St. Rock | F28F 21/062 |
| 2017/0205149 A1* | 7/2017 | Herring | F28F 1/04 |
| 2017/0248372 A1 | 8/2017 | Emo et al. | |
| 2018/0245853 A1 | 8/2018 | Sennoun et al. | |
| 2018/0245854 A1 | 8/2018 | Sabo et al. | |
| 2018/0283810 A1 | 10/2018 | Mironets et al. | |
| 2018/0292146 A1 | 10/2018 | Furrer et al. | |

FOREIGN PATENT DOCUMENTS

| | | |
|---|---|---|
| JP | 2007255754 A | 10/2007 |
| WO | 2016016330 A1 | 2/2016 |

\* cited by examiner

HEAT EXCHANGER RIBLET AND TURBULATOR FEATURES FOR IMPROVED MANUFACTURABILITY AND PERFORMANCE

BACKGROUND

The present disclosure relates to heat exchangers, and more particularly, to an improved plate-fin heat exchanger that improves the manufacturability and performance, particularly when additive manufacturing methods are used.

Plate-fin heat exchangers are well known in the aviation arts and in other industries for providing a compact, low-weight, and highly-effective means of exchanging heat from a hot fluid to a cold fluid. A plate-fin heat exchanger core of the prior art is typically constructed by individually stacking alternating layers of hot and cold fluid fins, applying closure bars to separate the hot fluid circuit from the cold fluid circuit, and then brazing the assembly. A metal or metal alloy can typically be used as the material for the heat exchanger core. After the plate-fin heat exchanger core is constructed, hot and cold inlet and outlet manifolds are typically welded to the respective ends of the hot and cold fluid circuits. Heat exchanger core performance can be improved through core designs that include additively-manufactured physical features. However, the additive manufacturing of horizontal features (with respect to the build direction) can result in unpredictable surface finishes. Accordingly, there is a need for an improved plate-fin heat exchanger core design that lends itself to additive manufacturability while also allowing for the build of physical features to provide a more robust design that can also provide for improved heat transfer performance.

SUMMARY

A heat exchanger includes a number of first layers for receiving a first fluid, each of the first layers including one or more first layer flow channels, at least one having one or more features, and number of second layers for receiving a second fluid, at least one having one or more features. Each of the first layers is sandwiched between adjacent second layers, each of the second layers is sandwiched between adjacent first layers, and a layer wall is located between each adjacent first layer and second layer, fluidly separating the corresponding first layer flow channels from the corresponding second layer flow channels. The one or more first layer flow channels define a first fluid flow direction, and the one or more second layer flow channels define a second fluid flow direction. Each feature is either a riblet or a turbulator. A riblet includes a riblet peak and/or a riblet valley, which has a riblet slope, and the riblet peak and/or riblet valley has a riblet axis that is generally parallel to either the first fluid flow direction or the second fluid flow direction. A turbulator includes a turbulator peak and/or a turbulator valley, which has a turbulator slope, and the turbulator peak and/or turbulator valley has a turbulator axis that is generally perpendicular to either the first fluid flow direction or the second fluid flow direction.

A method of additively manufacturing a heat exchanger having a number of first layers for receiving a first fluid, each having one or more first layer flow channels, and a number of second layers for receiving a second fluid, each having one or more second layer flow channels. The method includes the steps of: (a) additively manufacturing a first layer having one or more first layer flow channels having one or more features, (b) additively manufacturing a second layer having one or more second layer flow channels having one or more features, and (c) alternately repeating steps (a) and (b) until a desired number of first and second layers is obtained. A layer wall is located between each adjacent first layer and second layer, fluidly separating the corresponding first layer flow channels from the corresponding second layer flow channels. The one or more first layer flow channels define a first fluid flow direction, the one or more second layer flow channels define a second fluid flow direction, and each feature is either a riblet or a turbulator. A riblet includes a riblet peak and/or a riblet valley, which has a riblet slope, and the riblet peak and/or riblet valley has a riblet axis that is generally parallel to either the first fluid flow direction or the second fluid flow direction. A turbulator includes a turbulator peak and/or a turbulator valley, which has a turbulator slope, and the turbulator peak and/or turbulator valley has a turbulator axis that is generally perpendicular to either the first fluid flow direction or the second fluid flow direction.

DETAILED DESCRIPTION

The present disclosure provides a heat exchanger design that improves manufacturability of the heat exchanger while also providing for greater design versatility in the thermodynamic and/or hydrodynamic properties of the heat exchanger. In having greater control over the thermodynamic and/or hydrodynamic properties of the heat exchanger, the resulting heat exchanger can be adapted to a wider range of fluids, fluid flow rates, temperatures, and/or pressures. This disclosure is directed to a heat exchanger, while recognizing that a functioning heat exchanger could generally include inlet and outlet manifolds to complete the respective hot and cold circuits. Because a heat exchanger transfers heat from one fluid to another while maintaining a fluid separation between the two, heat will generally flow from the hot fluid to the cold fluid across the various components in the heat exchanger. Therefore, as used in this disclosure, "hot" will be used to describe the first fluid circuit and "cold" will be used to describe the second fluid circuit. The terms "hot" and "cold" are relative one to the other. As used in different embodiments, the heat exchanger can encounter temperatures ranging from near absolute zero (for example, in cryogenic distillation) to 1,000 deg. F. (538 deg. C.) or more (for example, in gas turbine engine systems and related components). Moreover, "hot" and "cold" are used in this disclosure as descriptive terms to refer to the various components that are associated with the respective first and second fluid circuits in the heat exchanger core, without implying that particular temperatures or a temperature relationship exists for those components during the manufacturing process of the heat exchanger core. The hot and cold fluids can each be a liquid, a gas, and/or a mixture of liquid and gas. The hot and/or cold fluids can change phase in or near the heat exchanger. The hot and/or cold fluids can entrain particles, which still being referred to as fluids. As used in this disclosure, "hydrodynamic" refers to the flowing properties of a fluid without regard to the phase of that fluid (i.e., "hydrodynamic" means "aerodynamic" if a fluid is a gas). One or both fluids can be referred to as a "medium" (i.e., a first medium and a second medium, or a hot medium and a cold medium).

Figure 1:
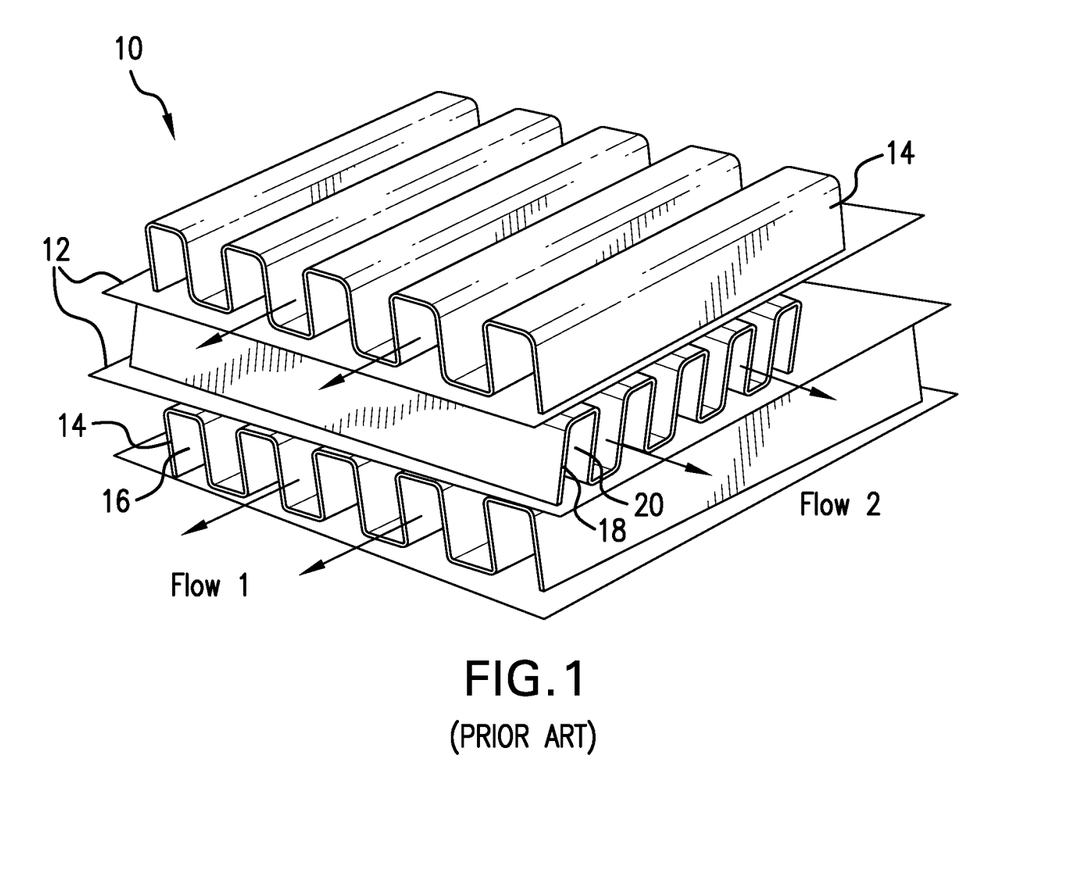
FIG. 1 is a perspective view of a plate-fin heat exchanger core design of the prior art.

FIG. 1 is a perspective view of a plate-fin heat exchanger core design of the prior art. Shown in FIG. 1 are heat exchanger core 10, parting sheets 12, first fins 14, first flow channels 16, second fins 18, and second flow channels 20. Parting sheets 12 are flat sheets of metal that can be brazed, and can contain a surface coating of a braze material. First fins 14 and second fins 18 can be corrugated sheets of metal. Alternate layers of first fins 14 and second fins 18 are stacked between parting sheets 12. The alternately-stacked layers are sandwiched between a bottom and top end sheet (not shown). The stacked components can be placed in a brazing furnace (not shown), thereby metallurgically joining the alternate layers of first fins 14 and second fins 18 to the respective parting sheets 12, resulting in a series of first flow channels 16 and second flow channels 20. The plate-fin heat exchanger core is known to those skilled in the heat exchanger art, with a more detailed description of its manufacture and operation being unnecessary for an understanding of the present disclosure. The descriptive name of the plate-fin heat exchanger comes from parting sheets 12 which can be called plates. A characteristic of heat exchanger core 10 is alternately-stacked first and second layers (i.e., hot and cold layers, respectively) being defined by first flow channels 16 and second flow channels 20, respective, in each respective layer. Generally, heat transfer can occur from a particular hot layer to the adjacent cold layers in either direction, which can result in a relatively high rate of heat transfer per unit volume of heat exchanger core 10.

Many engineered improvements can be contemplated to further improve the thermodynamic and/or hydrodynamic performance of a plate-fin heat exchanger of the prior art, which can be beneficial in increasing the rate of heat transfer per unit volume. Additive manufacturing (AM) can be beneficial in building a heat exchanger core which resembles the alternating layer style of the plate-fin heat exchanger of the prior art while including various engineered features that can improve the thermodynamic and/or hydrodynamic performance. A non-limiting exemplary AM process is powder bed fusion (PBF) which can be used to build a metallic component from the bottom up, while forming intricate features during the build process. Laser PBF (L-PBF) and electron Beam PBF (EM-PBF) are two non-limiting exemplary PBF processes that can be used to build additively-manufactured components of a heat exchanger. A disadvantage of PBF is the inability to build horizontal features (i.e., planar features that are approximately perpendicular to the build direction) having high surface integrity while also maintaining desired values of surface roughness and surface finish uniformity. Accordingly, unpredictable surface finishes can result from additively-manufactured heat exchanger cores, which in turn can lead to degraded thermodynamic and/or hydrodynamic performance. The heat exchanger core and core features of the present disclosure can overcome the aforementioned disadvantages of the AM process for building heat exchanger cores.

Several exemplary embodiments of additively-manufactured heat exchanger core sections are illustrated and described in this disclosure. In each example, the AM build direction is assumed to be in the direction of the z-axis, with the x-y plane being referred to as the horizontal plane (i.e., horizontal). Many of the illustrations in this disclosure depict perspective views in three dimensions, with the x-y-z coordinate axes being shown for clarity. In all cases, the z-axis is taken to be a vertical upward direction (i.e., upward from gravity). It is to be appreciated that additively-manufacturing a three-dimensional component such as a heat exchanger component necessarily involves building some features that appear to be "upside-down" with respect to gravity. Accordingly, the coordinate axis in each figure is to be observed.

Figure 2:
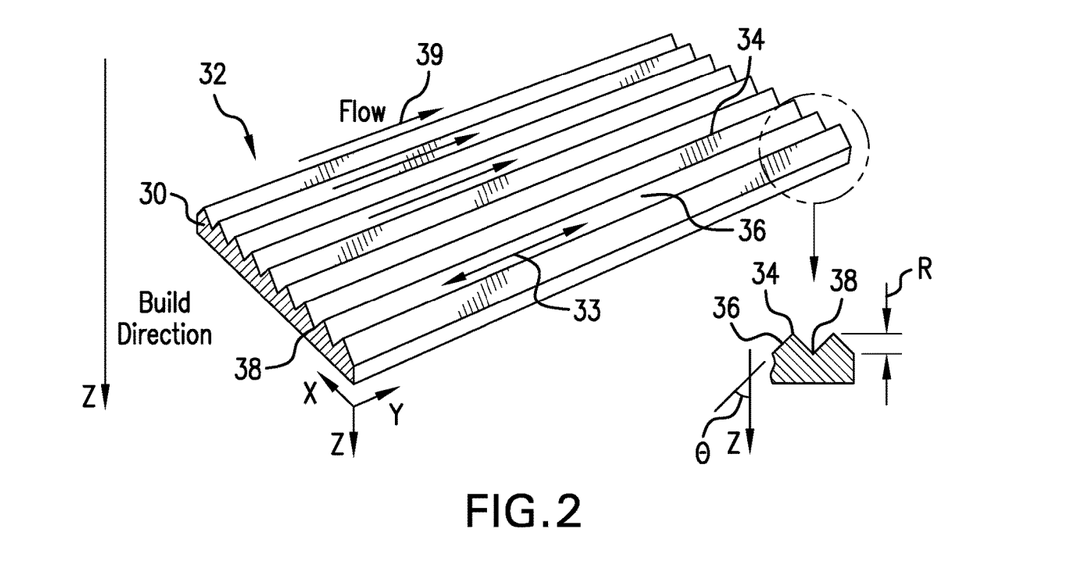
FIG. 2 is a perspective view of an internal surface of a heat exchanger core layer with riblets.

FIG. 2 is a perspective view of an internal surface of a heat exchanger core layer with riblets. It is to be noted that the illustration of FIG. 2 is upside-down (i.e., the z-axis points down). Shown in FIG. 2 are riblet wall 30, riblet 32, riblet axis 33, riblet peak 34, riblet slope 36, riblet valley 38, and flow direction 39. Riblets 32 are a repeating series of surface features in which adjacent riblets 32 are approximately parallel to each other. In the illustrated embodiment, riblets 32 are built on riblet wall 30 during an AM process. Riblet wall 30 can be a boundary that separates alternating hot and cold layers of a heat exchanger core (e.g., similar to parting sheet 12 as shown in FIG. 1). In some embodiments, riblet wall 30 can be referred to as a layer wall because it separates adjacent layers in a heat exchanger core. Each riblet 32 includes a repeating pattern of riblet peak 34, riblet slope 36, and riblet valley 38. As viewed from an end, the cross-sectional shape of riblets 32 can resemble a sawtooth (i.e., a triangular wave pattern). Riblet slope 36 has riblet slope angle $\theta$ relative to the build direction. In the illustrated embodiment, riblet slope angle $\theta$ is approximately 45°. In some embodiments, riblet slope angle $\theta$ can range from 25-65°, thereby resulting in the surface features of riblets 32 (i.e., riblet slopes 36) being non-horizontal with respect to the AM build direction. Horizontal surfaces that have been produced by PBF can have increased surface roughness as a result of reduced thermal dissipation of the incident energy beam resulting in over melting of underlying powder material as well as partial sintering of the powder particles. Introducing an angle to the surface geometry can change the thermal dissipative behavior, thereby reducing surface roughness (i.e., resulting in smoother, more uniform surface finish). Increased surface roughness can also cause surface integrity issues in terms of through-thickness defects which can affect the integrity of relatively thin horizontal features. Accordingly, building non-horizontal surface geometries can overcome these problems, and the resulting surface finish can have a much lower roughness value as compared to an additively-manufactured horizontal surface. In the illustrated embodiment, riblet peaks 34 and riblet valleys 38 have a sharp triangular appearance, having riblet height R measured from riblet peak 34 to riblet valley 38, and riblet slope 36 is generally flat. In other embodiments, riblet peaks 34 and/or riblet valleys 38 can be rounded.

Referring again to FIG. 2, the flow of a fluid in flow direction 39 is approximately parallel to riblet axis 33 (i.e., the direction of riblet peaks 34 and riblet valleys 38), thereby aiding in the uniform laminar flow of fluid through a respective layer. The relatively deep and narrow aspect of riblets 32 can further aid in producing laminar flow of a fluid with a relatively low resistance to flow. Accordingly, a heat exchanger component (e.g., core, manifold) that includes riblets 32 can result in a relatively low pressure drop (i.e., head loss) in a fluid flowing therethrough.

Figure 3:
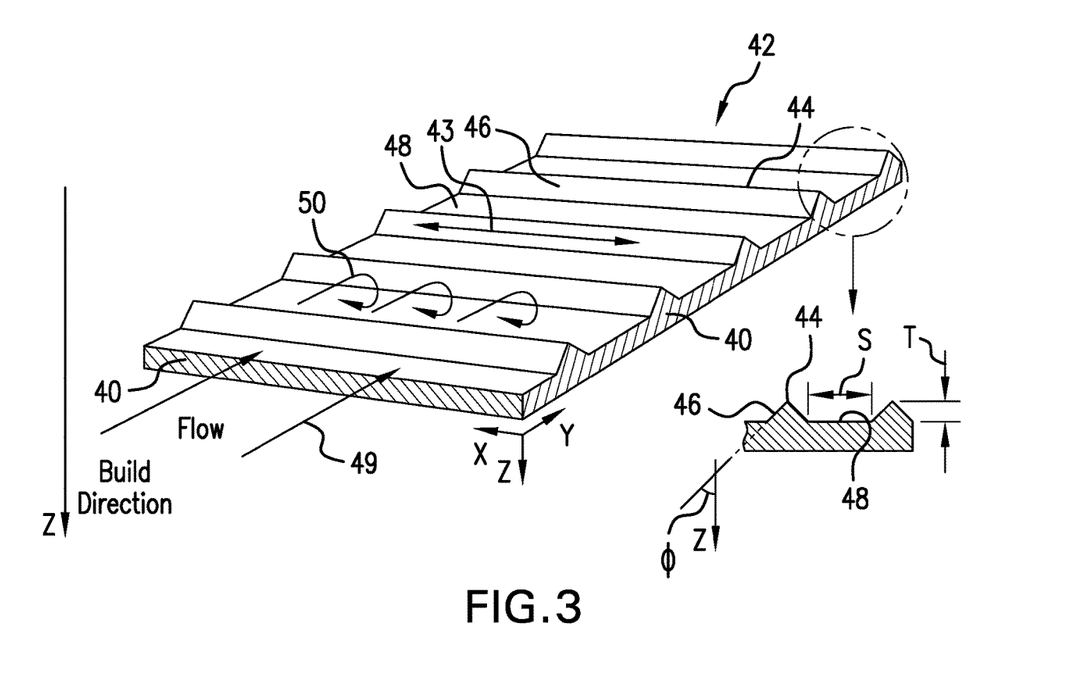
FIG. 3 is a perspective view of an internal surface an internal surface of a heat exchanger core layer with turbulators.

FIG. 3 is a perspective view of an internal surface an internal surface of a heat exchanger core layer with turbulators. It is to be noted that the illustration of FIG. 3 is upside-down (i.e., the z-axis points down). Shown in FIG. 3 are turbulator wall 40, turbulator 42, turbulator axis 43, turbulator peak 44, turbulator slope 46, turbulator valley 48, flow direction 49, and flow turbulence 50. In some embodiments, turbulator wall 40 can be referred to as a layer wall because it separates adjacent layers in a heat exchanger core. The description of the physical features of turbulators 42 is analogous to that of riblets 32 as above in respect to FIG. 2. Notably, adjacent turbulators 42 are approximately parallel to each other. In the illustrated embodiment, adjacent turbulators 42 are offset by turbulator valley 48, with a non-zero spacing existing between adjacent turbulators 42. In other embodiments, turbulators 42 can be spaced closer together, wherein turbulator valley 48 resembles a triangular feature (i.e., similar to riblet valleys 38 as shown in FIG. 2). Turbulator slope 46 has turbulator slope angle φ relative to the build direction. In the illustrated embodiment, turbulator slope angle φ is approximately 45°. In some embodiments, turbulator slope angle θ can range from 25-65°, thereby resulting in the surface features of turbulators 42 (i.e., turbulator slopes 46) being non-horizontal with respect to the AM build direction. As described above with respect to FIG. 2, horizontal surfaces that have been produced by PBF can have increased surface roughness, and introducing an angle to the surface geometry can change the thermal dissipative behavior, which can result in a surface finish having a much lower roughness value as compared to an additively-manufactured horizontal surface. In some embodiments, turbulators 42 can have feature geometries different from that shown in FIG. 3. Non-limiting examples of other feature geometries for turbulators 42 are half-round, elliptical, oblong, sinusoidal, and rectangular.

Referring again to FIG. 3, turbulator 42 has turbulator height T, as measured from turbulator peak 44 to turbulator valley 48, and turbulator valley 48 has streamwise-offset S (i.e., the flat space of turbulator wall 40 between adjacent turbulators 42). Accordingly, the ratio of streamwise-offset S to turbulator height T can be determined. In the illustrated embodiment, the ratio of streamwise-offset S to turbulator height T is about 5. In some embodiments, the ratio of streamwise-offset S to turbulator height T can range between 2-20. In other embodiments, the ratio of streamwise-offset S to turbulator height T can range between 0-100. In a particular embodiment where the ratio of streamwise-offset S to turbulator height T is 0, adjacent turbulators 42 will contact each other. In another particular embodiment, it is possible for the ratio of streamwise-offset S to turbulator height T to be greater than 100.

Referring again to FIG. 3, the flow of a fluid in flow direction 49 is approximately perpendicular to turbulator axis 43 (i.e., the direction of turbulator peaks 44), thereby creating flow turbulence 50 in a fluid flowing past (i.e., over or under) turbulators 42. Therefore, turbulators 42 can increase fluid turbulence in the vicinity of turbulator walls 40, thereby increasing the heat transfer coefficient of turbulator wall 40. Accordingly, a heat exchanger core that includes turbulators 42 in one or more layers can have a greater rate of heat transfer per unit volume as compared to a heat exchanger core that does not include turbulators 42. It is to be appreciated that the action of turbulators 42 in creating flow turbulence 50 can cause a restriction to flow as compared to a flat surface, which can result in a greater pressure drop (i.e., head loss) in a fluid flowing therethrough. Accordingly, the advantage that can be achieved in a heat exchanger that includes turbulators 42 is that the improvement in heat transfer more than offsets the increase in pressure drop, thereby resulting in an overall improved thermodynamic-hydrodynamic performance of a heat exchanger.

Figure 4A:
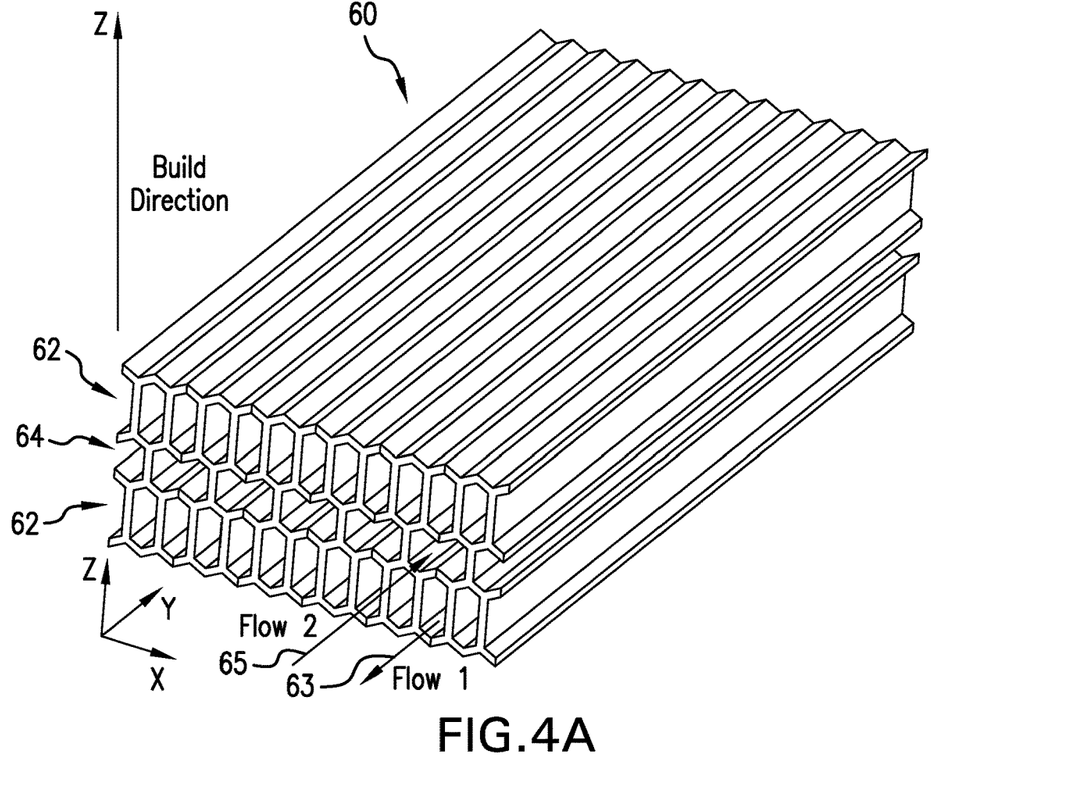
FIG. 4A is a perspective view of several layers of a parallel-flow heat exchanger core.
Figure 4B:
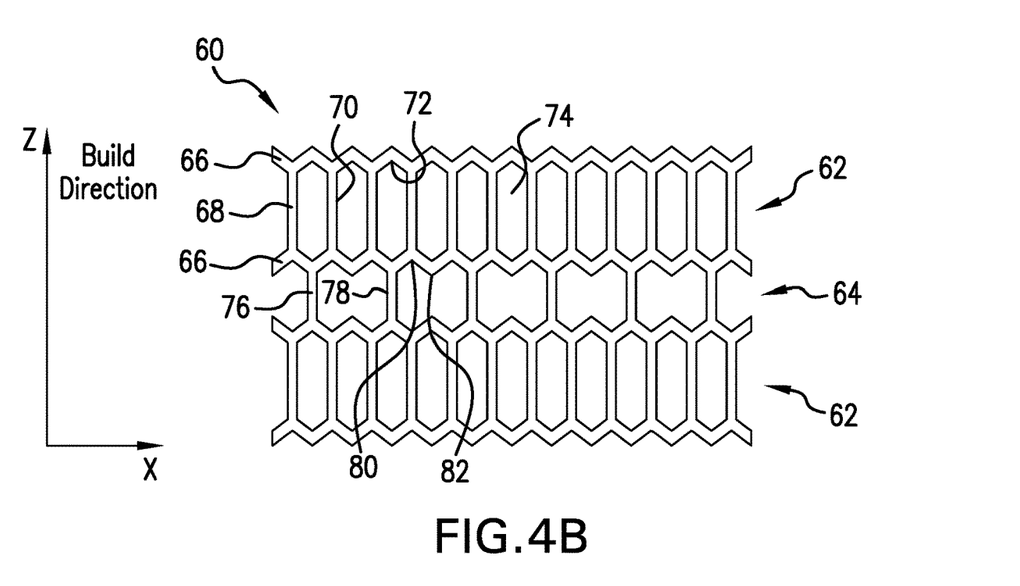
FIG. 4B is an end view of the several layers of the parallel-flow heat exchanger core shown in FIG. 4A.

FIG. 4A is a perspective view of several layers of a parallel-flow heat exchanger core. FIG. 4B is an end view of the several layers of the parallel-flow heat exchanger core shown in FIG. 4A. Shown in FIGS. 4A-4B are layer section 60, first layer 62, first flow direction 63, second layer 64, second flow direction 65, layer wall 66, first layer riser 68, first layer sidewall 70, first layer valley 72, first layer flow channel 74, second layer riser 76, second layer sidewall 78, second layer valley 80, second layer peak 82, and second layer flow channel 84. Layer section 60 represents a counter-flow heat exchanger because the direction of flow 1 in first layer 62 in first flow direction 63 is approximately parallel to, but in the opposite direction of, that of flow 2 in second layer 64 in second flow direction 65. Layer section 60, as shown in FIGS. 4A-4B, illustrates representative first and second layers 62, 64 of an additively-manufactured heat exchanger core. In some embodiments, layer section 60, with the addition of end manifolds (not shown) could form a heat exchanger. In other embodiments, alternating first and second layers 62, 64 could continue to practically any number of first and second layers 62, 64 in order to provide a desired rate of heat transfer in a heat exchanger.

Referring to FIG. 4B, first layer 62 includes layer walls 66 on the top and bottom and a series of first layer risers 68. Layer walls 66 and first layer sidewalls 70 define each first layer flow channel 74. Each first layer flow channel 74 includes two first layer valleys 72, with each first layer valley 72 being formed by an associated layer wall 66. Layer walls 66 and second layer sidewalls 78 define each second layer flow channel 84. Each second layer flow channel 84 includes four second layer valleys 80 and two second layer peaks 82, as shown in FIG. 4B. Any particular layer wall 66 separates adjacent first layer 62 and second layer 64. Therefore, an adjacent first layer 62 and second layer 64 includes a shared layer wall 66.

As illustrated in FIG. 4B, none of the internal surfaces of first and second layer flow channels 74, 84 are horizontal with respect to the build direction, thereby avoiding uncontrolled surface finish as described above with regard to FIG. 2. Moreover, first and second layer valleys 72, 80, and second layer peaks 82, can have properties similar to those of riblets 32 as described above with regard to FIG. 2. Accordingly, first and second layer flow channels 74, 84 can contribute to improved laminar flow therethrough, resulting in less pressure drop (i.e., head loss) in fluids flowing through a heat exchanger that includes layer section 60.

FIGS. 4A-4B depict an exemplary embodiment of first and second layers 62, 64. In some embodiments, one or more first layer flow channel 74 can have two or more first layer valleys 72 on any particular layer wall 66, thereby forming an associated one or more first layer peaks (not shown) between each adjacent first layer valley 72. Similarly, in some embodiments, one or more second layer flow channels 84 can have three or more second layer valleys 80 on any particular layer wall 66, thereby forming two or more second layer peaks 82 between each adjacent second layer valley 80. In yet other embodiments, one or more second layer flow channels 84 can have only a single second layer valley 80 on any particular layer wall 66, thereby resulting in no second layer peak 82.

Figure 5:
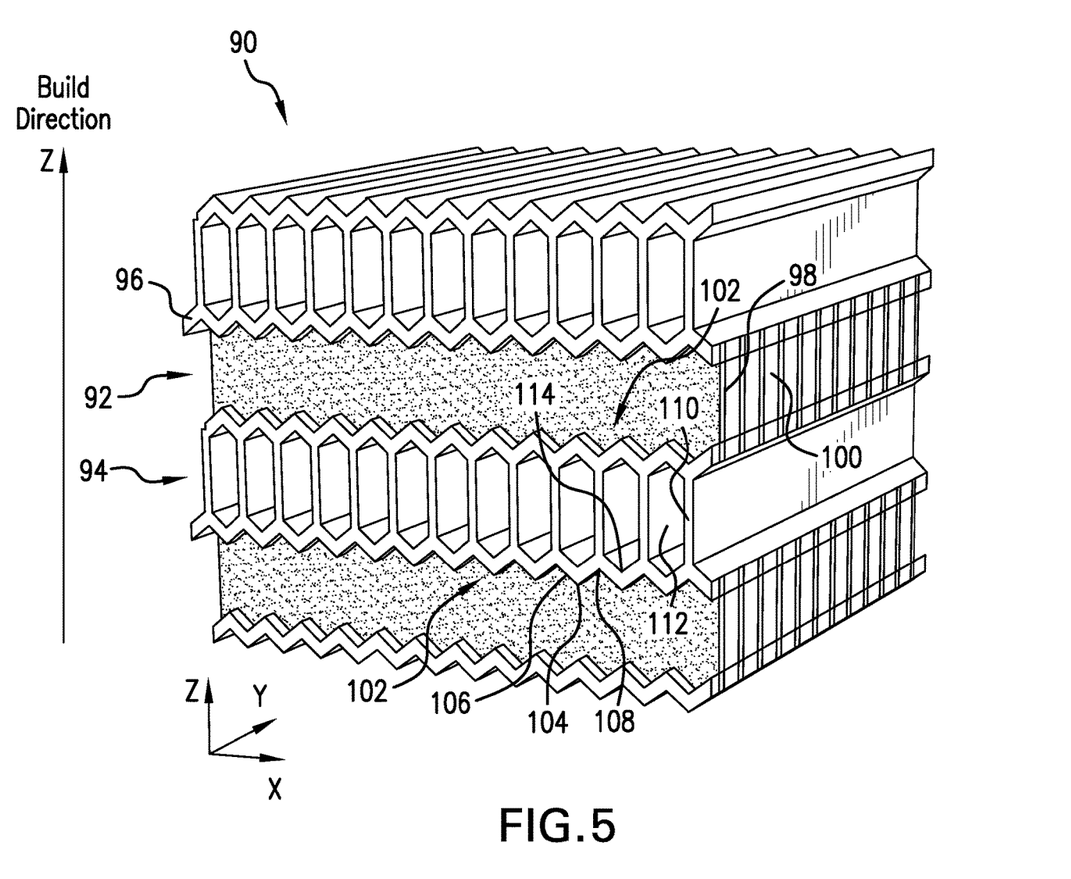
FIG. 5 is a perspective view of several layers of a cross-flow heat exchanger core.

FIG. 5 is a perspective view of several layers of a cross-flow heat exchanger core. Shown in FIG. 5 are cross-flow layer section 90, first layer 92, second layer 94, layer wall 96, first layer riser 98, first layer flow channel 100, turbulator 102, turbulator peak 104, turbulator slope 106, turbulator valley 108, and second layer riser 110. In the illustrated embodiment, first and second layers 92, 94 are approximately perpendicular to each other, being representative of a cross-flow heat exchanger.

First layer 92 includes layer walls 96 on the top and bottom and a series of first layer risers 98. Layer walls 96 and first layer risers 98 define each first layer flow channel 100. Each first layer flow channel 100 includes two associated first layer risers 96 and a series of turbulators 102, with each turbulator 102 including turbulator peak 104, turbulator slopes 106, and turbulator valley 108. As shown in FIG. 5, the direction of flow through any particular first layer flow channel 100 will be approximately perpendicular to turbulators 102, with turbulators 102 creating flow turbulence as was described above with regard to FIG. 3.

Second layer 94 includes layer walls 96 on the top and bottom and a series of second layer risers 110. Layer walls 96 and second layer risers 110 define each second layer flow channel 112, with each second layer flow channel 112 including a second layer valley on each layer wall 96. Any particular layer wall 96 separates adjacent first layer 92 and second layer 94. Therefore, an adjacent first layer 92 and second layer 94 includes a shared layer wall 66.

As illustrated in FIG. 5, none of the internal surfaces of first and second layer flow channels 100, 112 are horizontal with respect to the build direction, thereby avoiding uncontrolled surface finish as described above with regard to FIG. 2. Moreover, second layer valleys 114 can have properties similar to those of riblets 32 as described above with regard to FIG. 2. Accordingly, second layer flow channels 112 can contribute to improved laminar flow therethrough, resulting in less pressure drop (i.e., head loss) in fluids flowing through second layer 94 of a heat exchanger that includes cross-flow layer section 90.

Figure 6:
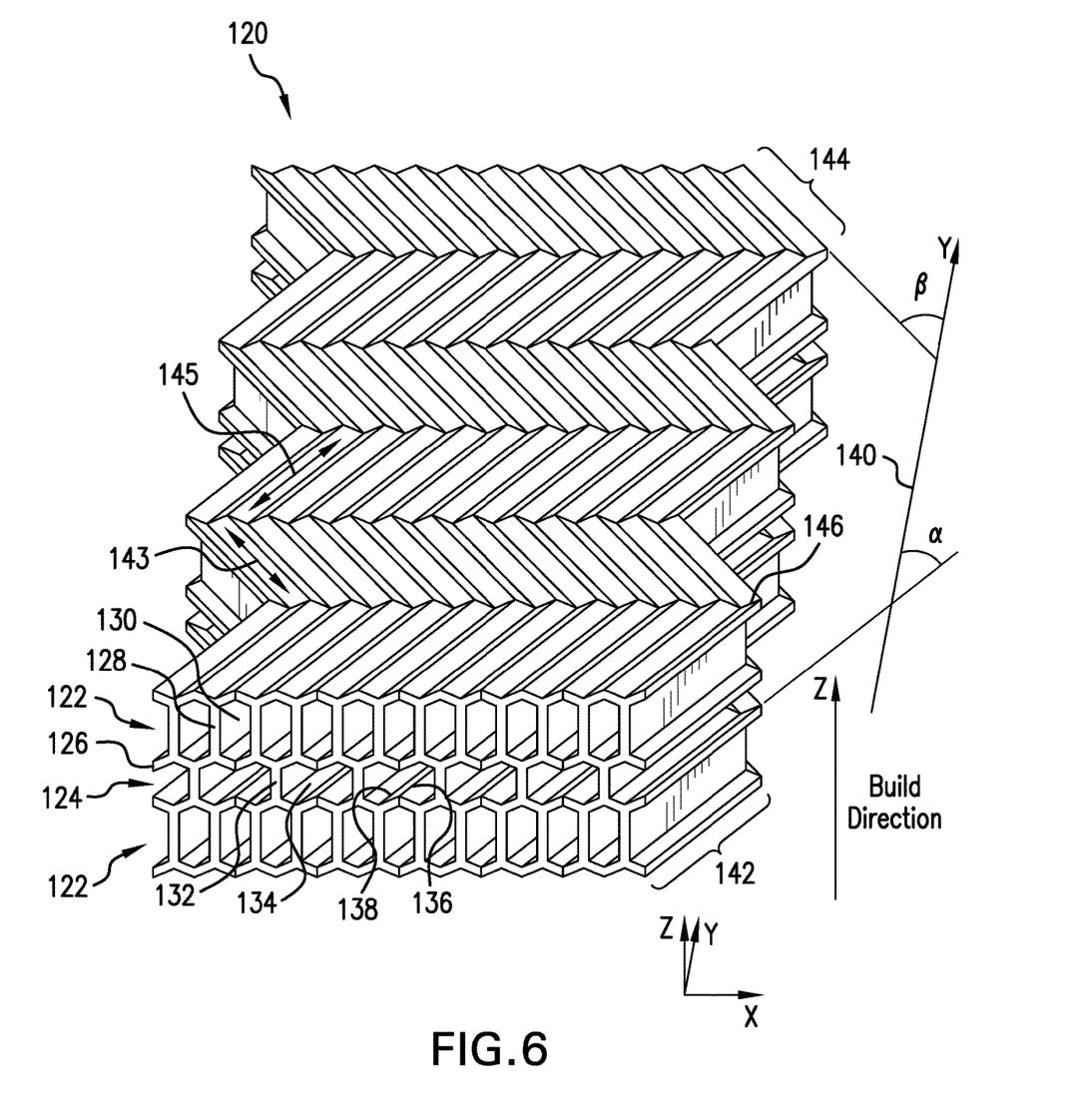
FIG. 6 is a perspective view of several layers of a second embodiment of a parallel-flow heat exchanger core.

FIG. 6 is a perspective view of several layers of a second embodiment of a parallel-flow heat exchanger core. Shown in FIG. 6 are zigzag layer section 120, first layer 122, second layer 124, layer wall 126, first layer riser 128, first layer flow channel 130, second layer riser 132, second layer flow channel 134, second layer peak 136, second layer valley 138, major axis 140, zig section 142, zig section axis 143, zig angle α, zag section 144, zag section axis 145, zag angle β, zigzag transition 146. First and second layers 122, 124 include first and second layer flow channels 130, 134, being formed by layer walls 126 and first and second layer risers 128, 132. The description of first and second layer flow channels 130, 134, and the various features contained therein, is substantially similar to that provided above with respect to FIGS. 4A-4B. Notably, none of the internal surfaces of first and second layer flow channels 130, 134 are horizontal with respect to the build direction, thereby avoiding uncontrolled surface finish as described above with regard to FIG. 2. Within each second layer flow channel 134, each second layer peak 136 together with adjoining second layer valleys 138 function as a riblet described above with regard to FIG. 2. In some embodiments, a particular second layer flow channel 134 can have more than or fewer than the number of second layer peaks 136 and second layer valleys 138 shown in FIG. 6. Similarly, in some embodiments, a particular first layer flow channel 130 can have more than the number of first layer peaks and valleys (not labeled) shown in FIG. 6.

Referring again to FIG. 6, zigzag layer section 120 is characterized as having major axis 140 and alternating zig sections 142 and zag sections 144 along the length of first and second layer flow channels 130, 134, with zigzag transition 146 denoting the transition from any particular zig section 142 to zag section 144, or vice versa. Each zig section 142 has zig axis 143, and each zag section 144 has zag axis 145. Accordingly, zigzag layer section 120 can be characterized as having one or more zig sections 142 and one or more zag sections 144, with the total number of each being within plus/minus one of the other. In the exemplary embodiment shown in FIG. 6 there are three zig sections 142, three zag sections 144, and five zigzag transition 146. In other embodiments there can be more than, or fewer than, those shown. Moreover, as was described above in respect to FIGS. 4A-4B, practically any number of first and second layers 122, 124 can be used in a heat exchanger core that includes zigzag layer section 120.

Referring again to FIG. 6, the axis of first and second layer flow channels 130, 134 in zig section 142 has zig angle α with respect to major axis 140. Similarly, the axis of first and second layer flow channels 130, 134 in zag section 144 has zag angle θ with respect to major axis 140. As first and second fluids flows through first and second layer flow channels 130, 134, the vector direction of those fluids abruptly changes at each zigzag transition 146, with the angular directional change being approximately α+β. This abrupt change interrupts the laminar flow, disrupting the boundary layers of the first and second fluids flows, and in turn increasing the heat transfer coefficient in first and second layer flow channels 130, 134. Accordingly, zigzag transitions 146 can improve the thermodynamic performance, thereby having greater rate of heat transfer per unit volume as compared to a heat exchanger core that does not include zigzag transitions 146. In the illustrated embodiment, zig angle α is approximately 30°, and zag angle θ is approximately 30°. In some embodiments, zig angle α and/or zag angle θ can be less than 30°. In yet other embodiments, zig angle α and/or zag angle θ can be greater than 30°. In some embodiments, zig angle α and/or zag angle θ can range from about 15-45°. In other embodiments, zig angle α and/or zag angle θ can range from about 5-60°. While a zig angle α and/or zag angle θ greater than about 60° can be impractical in some embodiments, any angular measure of zig angle α and/or zag angle θ is within the scope of the present disclosure. Moreover, zigzag layer section 120 that includes riblets and/or turbulators, as described above in regard to FIGS. 2-3, can have an improved thermodynamic and/or hydrodynamic performance as compared to zigzag layer section 120 that does not include riblets and/or turbulators.

Referring again to FIG. 6, the length (not labeled) of each zig section 142 is approximately the same as each other, the length (not labeled) of each zag section 144 is approximately the same as each other, the length each zig section 142 is approximately equal to the length of each zag section 144, and zig angle α is approximately equal to zag angle β. In other embodiments, some or all of these aforementioned features can be different from the others, resulting in an unlimited number of different combinations. It is to be appreciated that the physical design of a particular embodiment of zigzag section 120 involves laying-out various possibilities of zig and zag sections 142, 144 with regard to lengths, zig angle α, and zag angle β, with trigonometric identities governing the interrelationship of the various lengths and angles.

Figure 7:
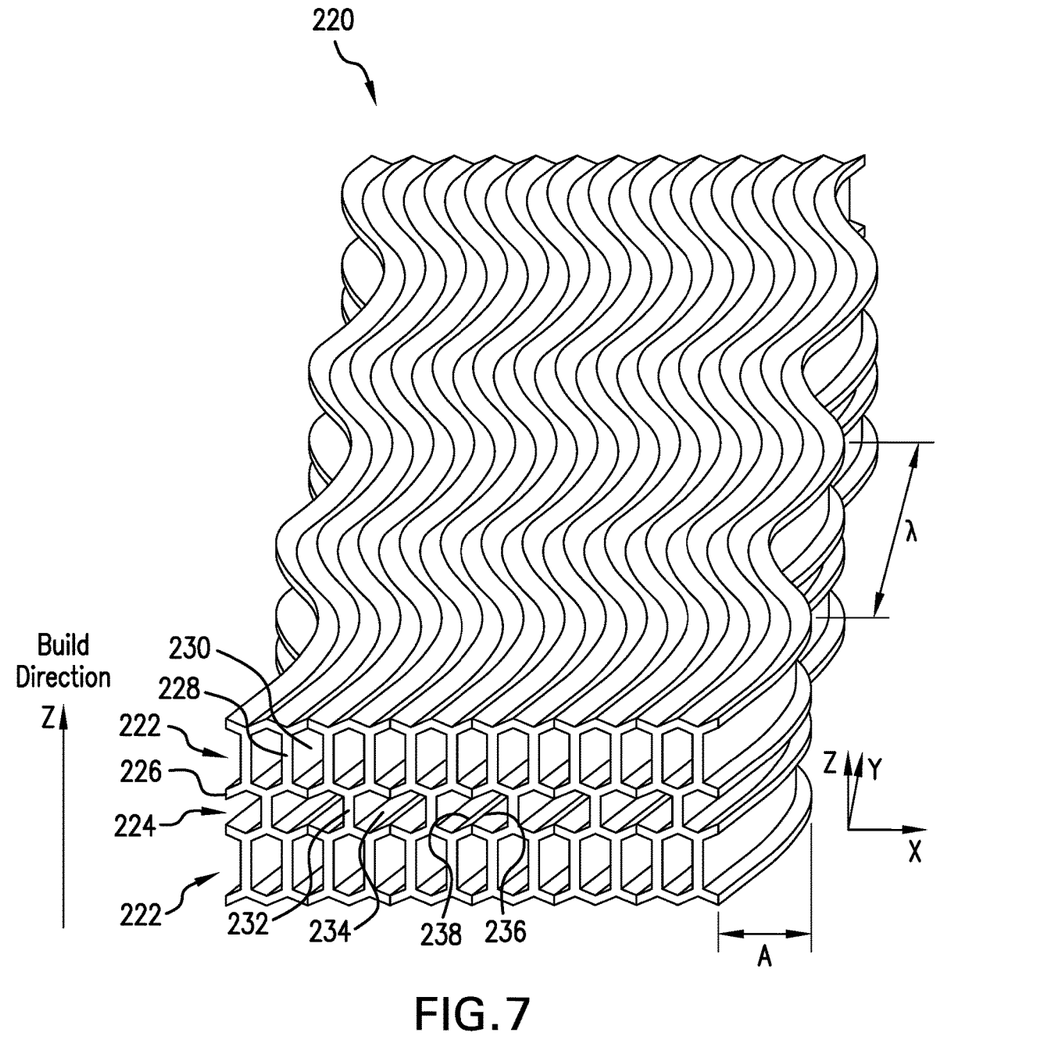
FIG. 7 is a perspective view of several layers of a third embodiment of a parallel-flow heat exchanger core.

FIG. 7 is a perspective view of several layers of a third embodiment of a parallel-flow heat exchanger core. Shown in FIG. 7 are sinuous layer section 220, first layer 222, second layer 224, layer wall 226, first layer riser 228, first layer flow channel 230, second layer riser 232, second layer flow channel 234, second layer peak 236, and second layer valley 238. First and second layers 222, 224 include first and second layer flow channels 230, 234, being formed by layer walls 226 and first and second layer risers 228, 232. The description of first and second layer flow channels 230, 234, and the various features contained therein, is substantially similar to that provided above with respect to FIG. 6. It is to be appreciated that the flow of fluids through first and second layer flow channels 230, 234 periodically changes directions in a manner similar to that of zigzag layer section 120 as described above with respect to FIG. 6. First and second layer flow channels 230, 234 have a sinusoidal shape that can be characterized by amplitude A and wavelength λ, as shown in FIG. 7. It is to be noted that amplitude A refers to the peak-to-peak amplitude of the sinusoidal (i.e., sinuous) shape of first and second layer flow channels 230, 234. In the illustrated embodiment, the ratio of amplitude A to wavelength λ is about 0.5. In some embodiments, the ratio of amplitude A to wavelength λ can range between 0.2-2.0 A heat exchanger core having a sinusoidal shape (i.e., sinusoidal flow pattern) of first and second layer flow channels 230, 234 can result in an improved thermodynamic performance as compared to a heat exchanger core that does not include a sinusoidal shape, in a manner similar to that described above with respect to FIG. 6. Moreover, sinuous layer section 220 that includes riblets and/or turbulators, as described above in regard to FIGS. 2-3, can have an improved thermodynamic and/or hydrodynamic performance as compared to sinuous layer section 220 that does not include riblets and/or turbulators.

Figure 8:
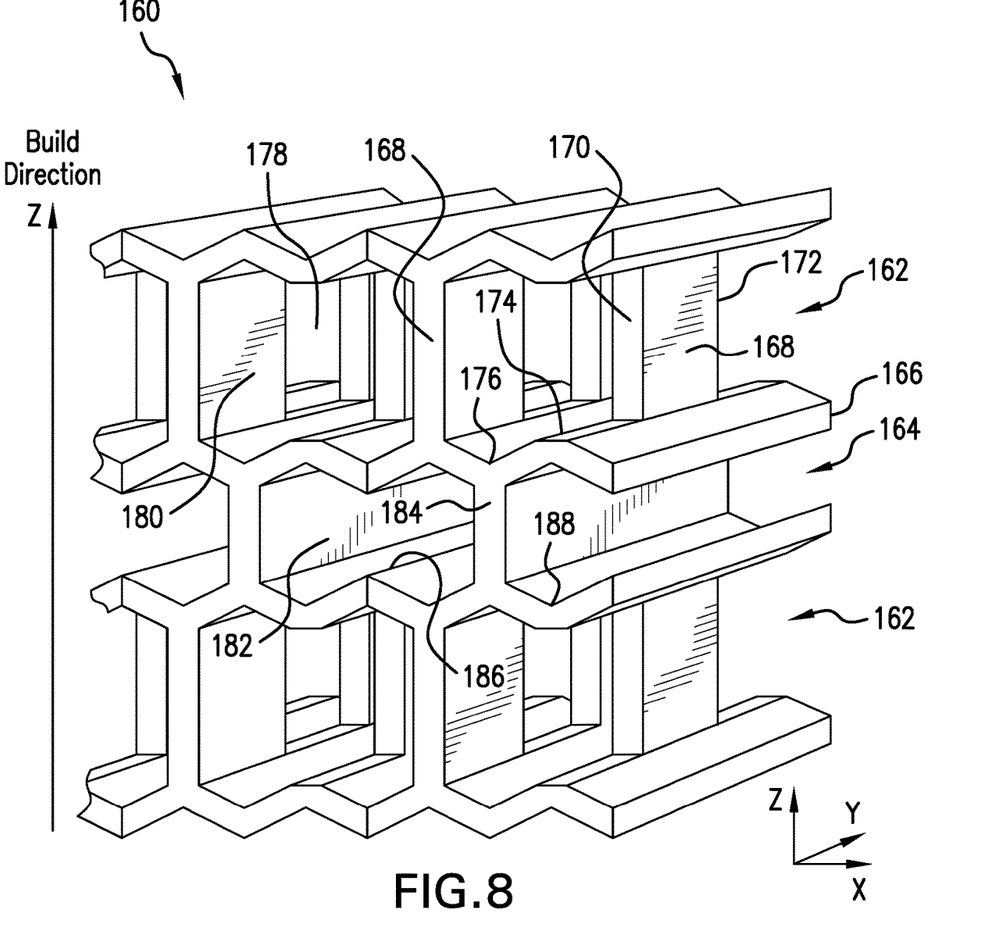
FIG. 8 is a perspective view of several layers of a fourth embodiment of a parallel-flow heat exchanger core.

FIG. 8 is a perspective view of several layers of a fourth embodiment of a parallel-flow heat exchanger core. Shown if FIG. 8 are strip fin layer section 160, first layer 162, second layer 164, layer wall 166, strip fin 168, first edge 170, second edge 172, first layer peak 174, first layer valley 176, intrachannel aperture 178, first layer flow channel 180, second layer flow channel 182, second layer riser 184, second layer peak 186, and second layer valley 188. First and second layers 162, 164 include first and second layer flow channels 180, 182. First layer flow channel 180 is formed by layer walls 166 and strip fins 168, with strip fins 168 not being continuous throughout first layer flow channels 180. Instead, a particular strip fin 168 has first edge 170 and second edge 172, thereby forming intrachannel apertures 178. First layer peaks 174 and first layer valleys 176 are formed by layer walls 166. Intrachannel apertures 178 can allow fluid communication between adjacent first layer flow channels 180. As fluid flows through first layer flow channels 180, the intermittent placement of strip fins 168 can induce flow turbulence as flow strikes a leading edge (i.e., either first edge 170 or second edge 172, depending on the direction of flow) of strip fin 168. Induced flow turbulence can improve the thermodynamic performance in first layer flow channel, which can contribute to a greater rate of heat transfer per unit volume as compared to a heat exchanger core that does not include strip fins 168. The design and placement of strip fins 168, and the resulting arrangement of intrachannel apertures 178, can help balance velocity profiles, dynamic pressure variations, and/or temperature profiles throughout first layer 162, which can in turn result in improved thermodynamic and/or hydrodynamic performance of a heat exchanger core that includes strip fin layer section 160. In the illustrated embodiment, each first layer flow channel 180 includes first layer peaks 174 and first layer valleys 176, with the description being substantially similar to that provided above in respect to FIGS. 4A-4B. In other embodiments, other numbers of first layer peaks 174 and first layer valleys 176 can be provided, as described above with respect to FIGS. 4A-4B.

Referring again to FIG. 8, second layer flow channels 182 are formed by layer walls 166 and second layer risers 184, providing second layer peaks and valleys 186, 188, having descriptions being substantially as provided above with respect to FIGS. 4A-4B. None of the internal surfaces of first and second layer flow channels 180, 182 are horizontal with respect to the build direction, thereby avoiding uncontrolled surface finish as described above with regard to FIG. 2. The exemplary embodiment of strip fin layer section 160 shows only first layers 162 (i.e., hot layers) including strip fins 168 and the resulting intrachannel apertures 178. In some embodiments, strip fins 168 and the resulting intrachannel apertures 178 can be only in second layer 164 (i.e., cold layers). In other embodiments, both first layers 162 and second layers 164 (i.e., both hot and cold layers) can include strip fins 168 and the resulting intrachannel apertures 178. Accordingly, in these other embodiments, second layer risers 184 would be replaced with second layer strip fins (not labeled). In some embodiments, the direction of flow through first and second layer flow channels 180, 182 can be either in the same direction (i.e., parallel flow) or in the opposite direction (i.e., counter-flow).

The exemplary embodiment of strip fin layer section 160 shown in FIG. 8 illustrates a parallel flow (or counter-flow) heat exchanger. In other embodiments, strip fins 168 can be included in a cross-flow heat exchanger, having a cross-flow layer structure similar to that shown above in FIG. 5. In these other embodiments, strip fins 168 and the resulting intrachannel apertures 178 can be located in first layers 162 and/or second layers 164.

The exemplary embodiments described in the present disclosure involved additive manufacturing methods. However, the scope of the present disclosure includes all methods for manufacturing a heat exchanger core having any or all of the disclosed features, with manufacturing methods including without limitation additive manufacturing, hybrid additive subtractive manufacturing, subtractive manufacturing, and casting.

The various heat exchanger components that have shown and described in the present disclosure can be made of metal or a metal using PBF. Non-limiting examples of metallic materials that can be used include nickel, aluminum, titanium, copper, iron, cobalt, and all alloys that include these various metals. In some embodiments, various alloys of INCONEL™ can be used to fabricate the various heat exchanger core components, with Inconel 625 and Inconel 718 being two exemplary alloy formulations. In other embodiments, HAYNES™ 282 can be used. All other material types and AM processes are within the scope of the present disclosure. Non-limiting examples of other materials include plastics, polymers, resins, ceramics, metals, and combinations thereof. Moreover, all other AM processes are within the scope of the present disclosure. Non-limiting examples of other AM processes include stereo lithography (SLA) and digital light processing (DLP).

DISCUSSION OF POSSIBLE EMBODIMENTS

The following are non-exclusive descriptions of possible embodiments of the present invention.

A heat exchanger comprising a plurality of first layers for receiving a first fluid, each of the plurality of first layers including one or more first layer flow channels, at least one of the one or more first layer flow channels having one or more features; and a plurality of second layers for receiving a second fluid; each of the plurality of second layers including one or more second layer flow channels, at least one of the one or more second layer flow channels having one or more features; wherein each of the plurality of first layers is sandwiched between adjacent second layers; each of the plurality of second layers is sandwiched between adjacent first layers; a layer wall is disposed between each adjacent first layer and second layer, fluidly separating the corresponding first layer flow channels from the corresponding second layer flow channels; the one or more first layer flow channels define a first fluid flow direction; the one or more second layer flow channels define a second fluid flow direction; and each feature is selected from the group consisting of a riblet, comprising a riblet peak and/or a riblet valley; wherein the riblet peak and/or riblet valley defines a riblet slope; the riblet peak and/or riblet valley defines a riblet axis; and the riblet axis is generally parallel to either the first fluid flow direction or the second fluid flow direction; and a turbulator, comprising a turbulator peak and/or a turbulator valley; wherein the turbulator peak and/or turbulator valley defines a turbulator slope; the turbulator peak and/or turbulator valley defines a turbulator axis, and the turbulator axis is generally perpendicular to either the first fluid flow direction or the second fluid flow direction.

The heat exchanger of the preceding paragraph can optionally include, additionally and/or alternatively, any one or more of the following features, configurations and/or additional components:

A further embodiment of the foregoing heat exchanger, wherein the first fluid direction is substantially parallel to the second fluid direction.

A further embodiment of the foregoing heat exchanger, wherein the first fluid direction is substantially perpendicular to the second fluid direction.

A further embodiment of the foregoing heat exchanger, wherein the heat exchanger is additively-manufactured, the additive manufacturing defining a build direction; the feature is a riblet; the riblet slope defines a riblet slope angle relative to the build direction; and the riblet slope angle is between 25-65 deg.

A further embodiment of the foregoing heat exchanger, wherein the heat exchanger is additively-manufactured, the additive manufacturing defining a build direction; the feature is a turbulator; the turbulator slope defines a turbulator slope angle relative to the build direction; and the turbulator slope angle is between 25-65 deg.

A further embodiment of the foregoing heat exchanger, wherein the turbulator defines a turbulator height; two adjacent turbulators define a streamwise-offset; and a ratio of the streamwise-offset to the turbulator height ranges from 2-20.

A further embodiment of the foregoing heat exchanger, wherein the feature further includes a strip fin; a plurality of strip fins is disposed in a respective first layer or respective second layer between corresponding adjacent layer walls; each of the plurality of strip fins defines a first edge and a second edge; adjacent strip fins define an intrachannel aperture, the intrachannel aperture fluidly connecting: adjacent first layer flow channels; and/or adjacent second layer flow channels.

A further embodiment of the foregoing heat exchanger, further comprising one or more zigzag transitions, each of the one or more zigzag transitions defining an adjacent zig section and zag section.

A further embodiment of the foregoing heat exchanger, wherein: the heat exchanger defines a major axis; each zig section defines a zig section flow axis, defining a zig angle relative to the major axis; each zag section defines a zag section flow axis, defining a zag angle relative to the major axis; the zig angle is between 5-60 deg.; and the zag angle is between 5-60 deg.

A further embodiment of the foregoing heat exchanger, wherein the zig angle is between 15-45 deg; and the zag angle is between 15-45 deg.

A further embodiment of the foregoing heat exchanger, wherein the first and second layer flow channels are configured to define a sinuous flow pattern, the sinuous flow pattern having an amplitude and a wavelength, wherein a ratio of the amplitude to the wavelength ranges between 0.2-2.0.

A further embodiment of the foregoing heat exchanger, wherein the plurality of first and second layers comprises one or more of nickel, aluminum, titanium, copper, iron, cobalt, and alloys thereof.

A further embodiment of the foregoing heat exchanger, wherein the heat exchanger is additively-manufactured, comprising Inconel 625, Inconel 718, Haynes 282, or AlSi10Mg.

A further embodiment of the foregoing heat exchanger, wherein the plurality of first and second layers comprises one or more of plastics, polymers, resins, ceramics, metals, and combinations thereof.

A method of additively manufacturing a heat exchanger comprising a plurality of first layers for receiving a first fluid, each of the plurality of first layers including one or more first layer flow channels, and a plurality of second layers for receiving a second fluid, each of the plurality of second layers including one or more second layer flow channels, the method comprising the steps of (a) additively manufacturing one of the plurality of first layers comprising one or more first layer flow channels having one or more features; (b) additively manufacturing one of the plurality of second layers comprising one or more second layer flow channels having one or more features; and (c) alternately repeating steps (a) and (b) until a desired number of first and second layers is obtained; wherein: a layer wall is disposed between each adjacent first layer and second layer, fluidly separating the corresponding first layer flow channels from the corresponding second layer flow channels; the one or more first layer flow channels define a first fluid flow direction; the one or more second layer flow channels define a second fluid flow direction; and each feature is selected from the group consisting of a riblet, comprising a riblet peak and/or a riblet valley; wherein the riblet peak and/or riblet valley defines a riblet slope; the riblet peak and/or riblet valley defines a riblet axis; and the riblet axis is generally parallel to either the first fluid flow direction or the second fluid flow direction; and a turbulator, comprising a turbulator peak and/or a turbulator valley; wherein the turbulator peak and/or turbulator valley defines a turbulator slope; the turbulator peak and/or turbulator valley defines a turbulator axis, and the turbulator axis is generally perpendicular to either the first fluid flow direction or the second fluid flow direction.

The method of the preceding paragraph can optionally include, additionally and/or alternatively, any one or more of the following features, configurations and/or additional components:

A further embodiment of the foregoing method, wherein the additive manufacturing defines a build direction; the feature is a riblet; the riblet slope defines a riblet slope angle relative to the build direction; and the riblet slope angle is between 25-65 deg.

A further embodiment of the foregoing method, wherein the additive manufacturing defines a build direction; the feature is a turbulator; the turbulator slope defines a turbulator slope angle relative to the build direction; and the turbulator slope angle is between 25-65 deg.

A further embodiment of the foregoing method, wherein the turbulator defines a turbulator height; two adjacent turbulators define a streamwise-offset; and a ratio of the streamwise-offset to the turbulator height ranges from 2-20.

A further embodiment of the foregoing method, wherein the plurality of first and second layers comprises one or more of nickel, aluminum, titanium, copper, iron, cobalt, and alloys thereof.

A further embodiment of the foregoing method, wherein the plurality of first and second layers comprises one or more of plastics, polymers, resins, ceramics, metals, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a plurality of first layers for receiving a first fluid, each of the plurality of first layers including one or more first layer flow channels defining a first fluid flow direction, at least one of the one or more first layer flow channels having one or more first features and one or more third features opposite the first features, wherein each first feature comprises a riblet comprising a riblet peak and a riblet valley, and each third feature comprises a riblet comprising a riblet peak and a riblet valley, wherein, with respect to each of the first and third features:
   the riblet peak and riblet valley defines a riblet slope;
   the riblet peak and riblet valley defines a riblet axis;
   the riblet axis is generally parallel to the first fluid flow direction; and
   the riblet valley of the first feature is aligned with and opposite the riblet valley of the third feature in a direction generally perpendicular to the riblet axis; and
   a plurality of second layers for receiving a second fluid; each of the plurality of second layers including one or more second layer flow channels defining a second fluid flow direction that is substantially perpendicular to the first fluid flow direction, at least one of the one or more second layer flow channels having one or more second features, wherein each second feature comprises a turbulator, comprising a turbulator peak and a turbulator valley; wherein:
   the turbulator peak and turbulator valley defines a turbulator slope;
   the turbulator peak and turbulator valley defines a turbulator axis, and
   the turbulator axis is generally perpendicular to the second fluid flow direction;
   wherein:
   each of the plurality of first layers is sandwiched between adjacent second layers;
   each of the plurality of second layers is sandwiched between adjacent first layers; and
   a layer wall is disposed between each adjacent first layer and second layer, fluidly separating the corresponding first layer flow channels from the corresponding second layer flow channels.

2. The heat exchanger of claim 1, wherein:
   the heat exchanger is additively-manufactured, the additive manufacturing defining a build direction;
   the riblet slope defines a riblet slope angle relative to the build direction; and
   the riblet slope angle is between 25-65 deg.

3. The heat exchanger of claim 1, wherein:
   the heat exchanger is additively-manufactured, the additive manufacturing defining a build direction;
   the turbulator slope defines a turbulator slope angle relative to the build direction; and
   the turbulator slope angle is between 25-65 deg.

4. The heat exchanger of claim 3, wherein:
   the turbulator defines a turbulator height;
   two adjacent turbulators define a streamwise-offset; and
   a ratio of the streamwise-offset to the turbulator height ranges from 2-20.

5. The heat exchanger of claim 1, wherein:
   a plurality of strip fins is disposed in a respective first layer or respective second layer between corresponding adjacent layer walls;
   each of the plurality of strip fins defines a first edge and a second edge;
   adjacent strip fins define an intrachannel aperture, the intrachannel aperture fluidly connecting:
   adjacent first layer flow channels; and/or
   adjacent second layer flow channels.

6. The heat exchanger of claim 1, wherein the plurality of first and second layers comprises one or more of nickel, aluminum, titanium, copper, iron, cobalt, and alloys thereof.

7. The heat exchanger of claim 1, wherein the heat exchanger is additively-manufactured, comprising Inconel 625, Inconel 718, Haynes 282, or AlSi10Mg.

8. The heat exchanger of claim 1, wherein the plurality of first and second layers comprises one or more of plastics, polymers, resins, ceramics, metals, and combinations thereof.

9. A method of additively manufacturing a heat exchanger comprising a plurality of first layers for receiving a first fluid, each of the plurality of first layers including one or more first layer flow channels, and a plurality of second layers for receiving a second fluid, each of the plurality of second layers including one or more second layer flow channels, the method comprising the steps of:
   (a) additively manufacturing one of the plurality of first layers comprising one or more first layer flow channels defining a first fluid flow direction and having one or more first features and one or more third features opposite the first features, wherein each first feature comprises a riblet comprising a riblet peak and a riblet valley, and each third feature comprises a riblet comprising a riblet peak and riblet valley, wherein, with respect to each of the first and third features:
the riblet peak and riblet valley defines a riblet slope;
the riblet peak and riblet valley defines a riblet axis;
the riblet axis is generally parallel to the first fluid flow direction; and
the riblet valley of the first feature is aligned with and opposite the riblet valley of the third feature in a direction generally perpendicular to the riblet axis;
(b) additively manufacturing one of the plurality of second layers comprising one or more second layer flow channels defining a second fluid flow direction substantially perpendicular to the first fluid flow direction and having one or more second features, wherein each second feature comprises a turbulator, comprising a turbulator peak and a turbulator valley; wherein:
the turbulator peak and turbulator valley defines a turbulator slope;
the turbulator peak and turbulator valley defines a turbulator axis, and
the turbulator axis is generally perpendicular to the second fluid flow direction; and
(c) alternately repeating steps (a) and (b) until a desired number of first and second layers is obtained;
wherein:
a layer wall is disposed between each adjacent first layer and second layer, fluidly separating the corresponding first layer flow channels from the corresponding second layer flow channels.

10. The method of claim 9, wherein:
the additive manufacturing defines a build direction;
the riblet slope defines a riblet slope angle relative to the build direction; and
the riblet slope angle is between 25-65 deg.

11. The method of claim 9, wherein:
the additive manufacturing defines a build direction;
the turbulator slope defines a turbulator slope angle relative to the build direction; and
the turbulator slope angle is between 25-65 deg.

12. The method of claim 11, wherein:
the turbulator defines a turbulator height;
two adjacent turbulators define a streamwise-offset; and
a ratio of the streamwise-offset to the turbulator height ranges from 2-20.

13. The method of claim 9, wherein the plurality of first and second layers comprises one or more of nickel, aluminum, titanium, copper, iron, cobalt, and alloys thereof.

14. The method of claim 9, wherein the plurality of first and second layers comprises one or more of plastics, polymers, resins, ceramics, metals, and combinations thereof.

15. A heat exchanger comprising:
a plurality of first layers for receiving a first fluid, each of the plurality of first layers including one or more first layer flow channels defining a first fluid flow direction, at least one of the one or more first layer flow channels having one or more first features and one or more third features opposite the first features, wherein each first feature comprises a riblet comprising a riblet peak and a riblet valley, and each third feature comprises a riblet comprising a riblet peak and a riblet valley, wherein, with respect to each of the first and third features:
the riblet peak and riblet valley defines a riblet slope;
the riblet peak and riblet valley defines a riblet axis;
the riblet axis is generally parallel to the first fluid flow direction; and
the riblet valley of the first feature is aligned with and opposite the riblet valley of the third feature in a direction generally perpendicular to the riblet axis; and
a plurality of second layers for receiving a second fluid;
each of the plurality of second layers including one or more second layer flow channels defining a second fluid flow direction that is substantially perpendicular to the first fluid flow direction, at least one of the one or more second layer flow channels having one or more second features and one or more fourth features opposite the second features, wherein each second feature comprises a turbulator comprising a turbulator peak and a turbulator valley, and each fourth feature comprises a turbulator comprising a turbulator peak and a turbulator valley; wherein, with respect to each of the second and fourth features:
the turbulator peak and turbulator valley defines a turbulator slope;
the turbulator peak and turbulator valley defines a turbulator axis;
the turbulator axis is generally perpendicular to the second fluid flow direction; and
the turbulator peak of the second feature is aligned with and opposite the turbulator peak of the fourth feature in a direction generally perpendicular to the turbulator axis;
wherein:
each of the plurality of first layers is sandwiched between adjacent second layers;
each of the plurality of second layers is sandwiched between adjacent first layers; and
a layer wall is disposed between each adjacent first layer and second layer, fluidly separating the corresponding first layer flow channels from the corresponding second layer flow channels.

16. The heat exchanger of claim 15, wherein the riblet valley of the one or more first features and the turbulator peak of the one or more second features, and the riblet valley of the one or more third features and the turbulator peak of the one or more fourth features, are commonly formed by the layer wall between the respective adjacent first layer and second layer.

* * * * *